Figures 1, 2:
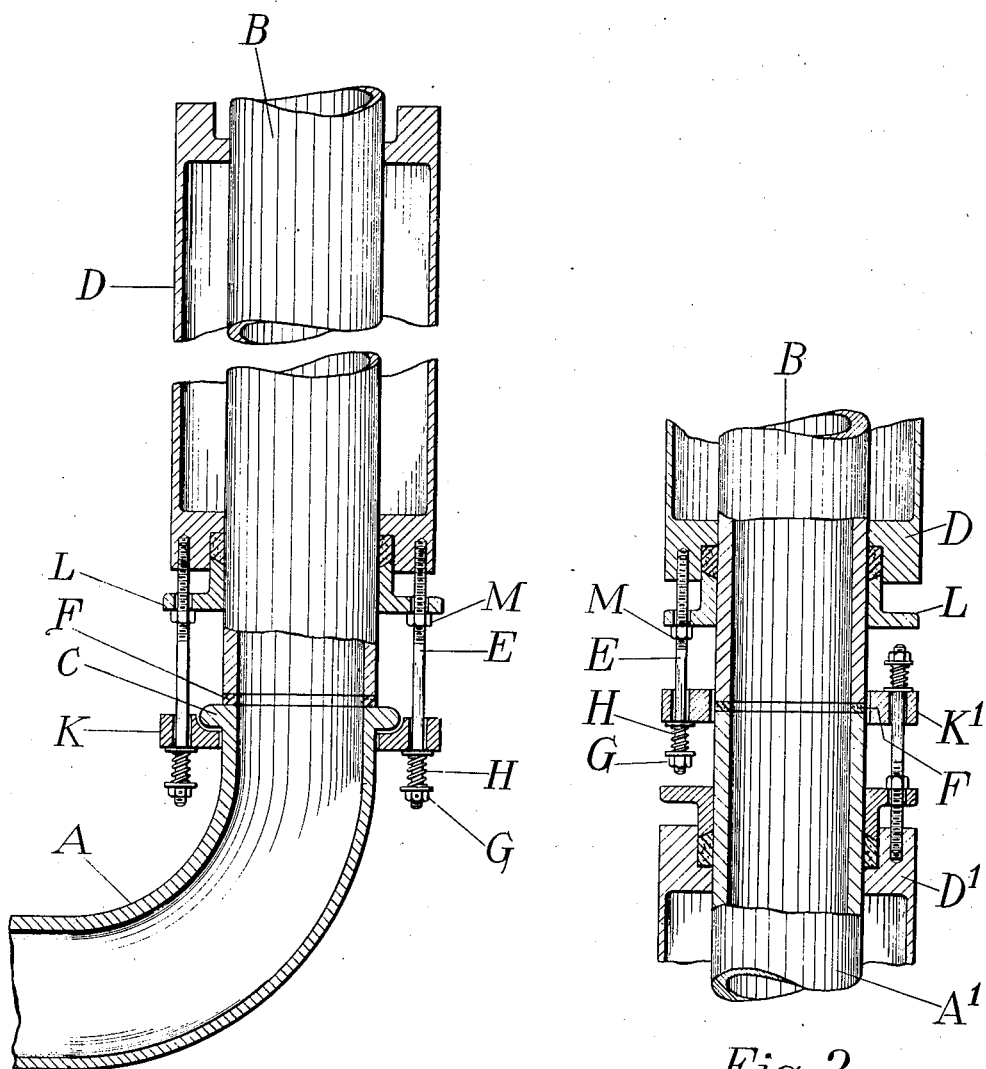

Nov. 13, 1934.  F. L. TAYLOR  1,980,451
TUBE JOINT
Filed June 17, 1932

INVENTOR.
Fred L. Taylor
BY
ATTORNEY.

Patented Nov. 13, 1934

1,980,451

UNITED STATES PATENT OFFICE 1,980,451

TUBE JOINT

Fred L. Taylor, Woodbury, N. J., assignor to E. I. du Pont de Nemours & Company, Wilmington, Del., a corporation of Delaware Application June 17, 1932, Serial No. 617,728

2 Claims. (Cl. 285—130)

This invention relates to improvements in pipe couplings, and more particularly to return bends for use on tubular stills, or like structures in which a fluid is heated and vapors are formed.

My invention is especially applicable to the joining tightly of tubes in systems in which the tubes are constructed of metals having different coefficients of expansion.

In metal pipe lines, or in apparatus using sections of metal pipe or tubes, various means have heretofore been used for joining together the different sections of such metal tubing, so that the joints will be sufficiently tight to prevent leaks of liquids, steam, or other vapors. For example, a common method of joining two lengths of pipe is by means of screw fittings, both sections of pipe being threaded on the outside, with a threaded coupling uniting the two lengths. Another well known method of joining pipes is by the use of flanges, in which the two threaded flanges are screwed onto the ends of the respective pipes, and a tight connection is made by means of bolts.

While the foregoing apparatus and methods are to a certain extent satisfactory under ordinary conditions, they are not adequate under special conditions that may arise. In the handling of various acids, for example, it is necessary that corrosion-resistant metals or alloys be used in the production of tubes for the manufacture or transportation of such acids. However, many of the alloys best adapted for exposure to the action of hot acids are very hard and brittle, and the threading of tubes, made of such alloys, causes a decided weakening of the metal. Even a groove provided in such metal as has been practiced in some instances is inadvisable and a source of danger. Because of the high cost of such acid-resistant alloys of ordinary metals and because of the danger in the event of leaks, it is highly essential that there be no weakening of tubes made of such metal.

I have found that these disadvantages may be overcome by securing the pair of elbows comprising the return bends directly to the ends of the steam jackets, independently of the tubes, by means of long studs. Because of the difference in the coefficient of expansion between tubes made of acid resistant silicon-iron alloys, such for example as Duriron, and steam jackets of ordinary metals (of about 2½ to 1 respectively), I find that the disadvantages and weakness inherent in such combinations heretofore used and described may be negatived by providing a spring member or like resilient means between the split-flange and the take-up nut on the end of each long stud in order to keep the joint tight while the unit is cooling down during shut-down periods.

My invention is applicable to any two-tube system, wherein an inner tube is used to contain acid or other fluid, this inner tube being jacketed by a surrounding tube of larger diameter. This outer tube serves to prevent loss of heat, for example, from the inner tube, or to supply heat to the inner tube and may, if desired, be filled with steam of the desired temperature, and pressure.

According to my invention, the tube joint is made with a minimum of strain on the inner tube. I bring about the joining tightly of the tubes, without great strain on the inner tube, by making the connection by means of bolts between the jacketing tubes, or by connecting an outer jacketing tube to an unjacketed tube.

By way of illustration, I will describe one form of my invention, in which a tight, leak-proof joint is formed between an inner, steam-jacketed tube and an unjacketed tube of the same metal as the aforesaid inner tube, the unjacketed tube serving as a return bend. This unjacketed return bend, or elbow, has an enlarged shoulder at the end. A split steel flange presses tightly against the said enlarged shoulder. Stud bolts pass through the flange, the threaded ends of the bolts entering the outer, jacketing metal tube adjoining, so that the two tubes may be screwed tightly together.

In the use of the method described above for joining the two tubes, a disadvantage may come in, due to the unequal coefficients of expansion of the metal of the outer jacketing tube and the metal of the inner tube and the return bend tube. This disadvantage I overcome by the introduction of a spring, preferably a helical, steel wire spring, or like resilient means under each of the take-up nuts, in order to lessen the tension on the bolts and to avoid leaks when the system cools.

In another form of my invention, I may join directly two tubes of metals of different coefficients of expansion. In this case, the use of an intermediate flange is necessary, for example a split steel flange. Stud bolts will then join the flange to the two jacketing tubes of the respective inner tubes. The required number of bolts in the opposite directions to the two jacketing tubes, will be properly spaced about the flange to give the desired degree of strength. In either form of my invention a gasket of lead, or other suitable metal or means, will preferably be used between the two connected tubes.

The form of my invention, first described above, is illustrated in the accompanying drawing, in Figure 1 of which the return bend A is joined to the jacketing tube D, which surrounds the inner tube B. The return bend has at its end the shoulder C, against which the flange K presses. The gasket F is placed between the two tubes that are joined. The flange K is tightened against the enlarged shoulder C by means of the bolts E and the take-up nuts G. The steel springs H are inserted between the nuts G and the flange K. The threaded bolts E screw into the walls of the jacketing tube D.

Another form of my invention is illustrated in Figure 2 in which like elements are designated by the same characters as in Figure 1, and in which my new flexible tube joint is applied to two similar sections of tubing, each having jackets thereon. In this figure the resilient ends of the stud bolts engage an intermediate ring or yoke and either one or the other of the jackets. In this modification I preferably arrange the stud bolts in alternate relation.

The herein described invention has a particular application in the case of installations, in which the jacketed tube of a brittle metal alloy is interposed between two return bend sections. With such a form of construction and assembly, the joining of the intermediate tube, by means of the jacketing tube, to the unjacketed elbows adjacent thereto gives a highly advantageous degree of flexibility to the system that reduces very greatly the strain and tension on the tube of acid resistant alloy.

While my invention is applicable to the making of tight joints between tubes in all tube-jacketed systems, I find a particular application for it when the inner tube of the system is of an acid resistant alloy, a silicon-iron alloy, for example such as is especially adapted for use with hot nitric acid. The following composition of an alloy of such a type illustrates a material that may be used for such inner tubes, and with which a method for joining the tubes, such as has been described heretofore, is particularly advantageous.

|  | Per cent |
|---|---|
| Iron | 84.5 |
| Silicon | 14.5 |
| Carbon | 0.75 |
| Manganese | 0.25 |

I have described my invention herein in much detail. However, many variations may be made therefrom in non-essential details, without departing from the spirit of the invention.

I claim:

1. In a coupling structure for connecting a pair of flow tubes both of difficultly machinable metal and arranged end-to-end, at least one of said tubes being arranged within a jacketing tube, for a temperature controlling medium, of substantially greater diameter than the enclosed tube and presenting at its end an inwardly projecting shoulder tightly encompassing the enclosed tube, and arranged adjacent the mating flow tube, a separate collar mounted on said mating tube in alignment with the shoulder of said jacket, means for holding said collar against movement along the carrying tube and toward said jacket, and draw bolts mounted in said collar and threaded into said shoulder.

2. In a coupling structure for connecting a pair of flow tubes of difficultly machinable metal and arranged end-to-end, each of said tubes being arranged within a jacketing tube, for a temperature controlling medium, of substantially greater diameter than the enclosed tube and presenting at its end an inwardly projecting shoulder tightly encompassing the enclosed tube, the shoulders of the two jackets being adjacent and arranged in alignment, a separate collar mounted on at least one of said tubes and between the jacket shoulders, draw bolts mounted in said collar and threaded into the shoulder of one of the jackets and constituting means for holding said collar against movement along the carrying tube and toward the other jacket, and other draw bolts mounted in said collar and threaded into said other jacket.

FRED L. TAYLOR.